United States Patent

Brücher et al.

Patent Number: 5,732,981
Date of Patent: Mar. 31, 1998

[54] JOINT BETWEEN AN UNREFRIGERATED PIPE AND A REFRIGERATED PIPE

[75] Inventors: Peter Brücher; Dieter Bormann; Rainer Heinze, all of Berlin, Germany

[73] Assignee: Deutsche Babcock-Borsig Aktiengesellschaft, Berlin, Germany

[21] Appl. No.: 666,003

[22] Filed: Jun. 19, 1996

[30] Foreign Application Priority Data

Aug. 25, 1995 [DE] Germany ............... 195 31 330.5

[51] Int. Cl.$^6$ ...................................... F16L 53/00
[52] U.S. Cl. ................. 285/41; 285/47; 285/286; 285/905
[58] Field of Search ............... 285/187, 47, 22, 285/286, 41, 905

[56] References Cited

U.S. PATENT DOCUMENTS

| | | | |
|---|---|---|---|
| 4,400,019 | 8/1983 | Fruck | 285/286 X |
| 4,997,211 | 3/1991 | Brucher | 285/47 X |

Primary Examiner—Dave W. Arola
Attorney, Agent, or Firm—Max Fogiel

[57] ABSTRACT

A joint between a hot and unrefrigerated pipe (1) and a refrigerated pipe (2). The end of the unrefrigerated pipe is bifurcated in cross-section, leaving two sections joined at one end. The exterior section (6) is fastened tight to the refrigerated pipe (2). The interior section (5) extends into the refrigerated pipe leaving a radial and axial gap. The cylindrical space between the interior and the exterior section is full of heat insulation. There is a flexible component, an O ring (13) for instance, between, and resting tight against, the face of the refrigerated pipe and that of the interior section of the unrefrigerated pipe. The insulation comprises an axial series of layers (10, 11, & 12), each with a different heat conductivity.

6 Claims, 1 Drawing Sheet

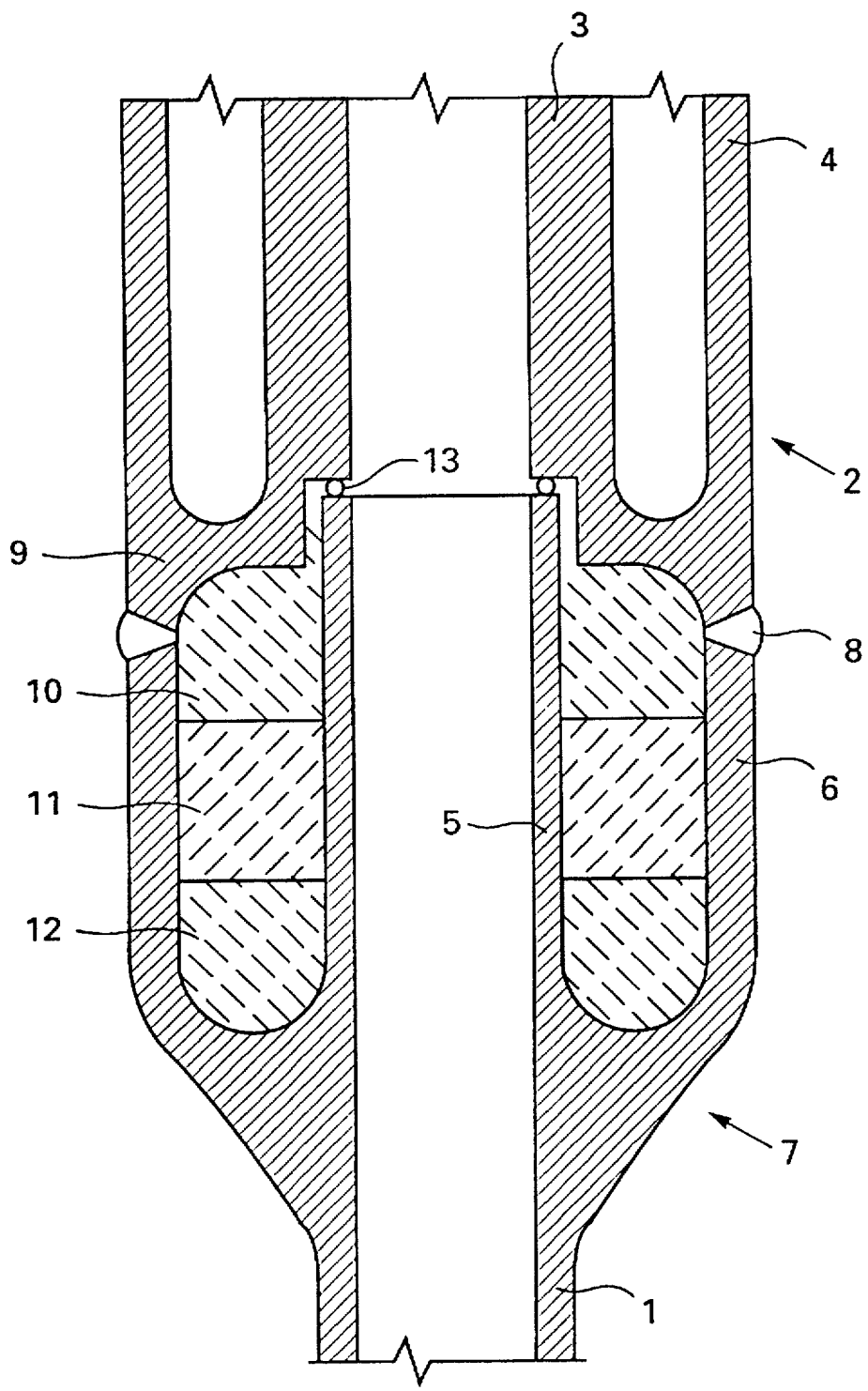

JOINT BETWEEN AN UNREFRIGERATED PIPE AND A REFRIGERATED PIPE

BACKGROUND OF THE INVENTION

The present invention concerns a joint between a hot and unrefrigerated pipe and a refrigerated pipe.

Such a joint is known from German Patent 3 910 630. The gap between the refrigerated pipe and the interior section of the unrefrigerated pipe allows temperature-dictated differential expansion, even though the two pipes are otherwise firmly fastened together. When insulation is added, it causes the temperature of the wall of the exterior section of the unrefrigerated pipe, which is fastened tight to the refrigerated pipe, to drop below the temperature of the gas flowing through the unrefrigerated pipe. The temperatures of the pipe walls at the joint accordingly even out, minimizing heat stress at that point.

The joint known from German Patent 3 910 630 has been proven. It has, however, been discovered in operation that gas from the unrefrigerated pipe can leak into the insulation through the gap between the pipes. Solids can simultaneously precipitate out of the gas and accumulate on the insulation to the detriment of its effectiveness. Furthermore, depending on the effectiveness of the insulation and on the temperatures of the gas and coolant, the temperature of the wall of the exterior section of the unrefrigerated pipe can decrease over its length, leading to heat stress.

SUMMARY OF THE INVENTION

The object of the present invention is to improve the generic joint to the extend that the effect of the insulation can be controlled.

The flexible component, preferably an O ring, between the face of the refrigerated pipe and that of the interior section of the unrefrigerated pipe allows for heat expansion. The same component, however, keeps gas out of the insulation and hence prevents the solids suspended in the gas from precipitating onto the insulation to the detriment of its effectiveness. The insulation will accordingly remain as effective as rated. The varying coefficients of heat conductivity in the different layers of insulation will result in insulation that increases as it approaches the refrigerated pipe, whereby the temperature of the wall of the exterior section of the unrefrigerated pipe will decrease gradually and subject to control, until it equals or approximates that of the wall of the refrigerated pipe in the vicinity of the joint.

BRIEF DESCRIPTION OF THE DRAWINGS

One embodiment of the present invention will now be specified with reference to the accompanying drawing, which is a longitudinal section through a joint between two pipes.

DESCRIPTION OF THE PREFERRED EMBODIMENTS

Hot gas flows through an unrefrigerated pipe 1, preferably a gas-cracking pipe in a furnace. The gas needs to be rapidly cooled as soon as it leaves the cracking pipe. Unrefrigerated pipe 1 accordingly communicates with a refrigerated pipe 2 that cools the gas traveling through it. Pipes 1 and 2 are aligned and preferably have the same inside diameter. Refrigerated pipe 2 is a double pipe. It comprises a core 3 and a jacket 4. A coolant, evaporating water for instance, flows through the cylindrical space between core 3 and jacket 4.

Unrefrigerated pipe 1 is to be fastened to refrigerated pipe 2 without stress. The end of unrefrigerated pipe 1 next to refrigerated pipe 2 is accordingly in the form of a head 7 with a bifurcating cross-section. Insertion head 7 comprises an interior section 5 and an exterior section 6. Sections 6 and 7 are connected at one end.

Exterior section 6 is fastened tight to the jacket 4 of refrigerated pipe 2. The joint is secured by an annular welded seam 8. The weld is augmented by an elevated edge 9 around jacket 4. Edge 9 is as thick as the wall of exterior section 6.

The interior section 5 of unrefrigerated pipe 1 extends into the core 3 of refrigerated pipe 2, leaving a radial and axial gap, exaggerated in the drawing, between the interior section and the core. The gap freely accommodates heat expansion on the part of unrefrigerated pipe 1 in relation to refrigerated pipe 2.

Insulation is accommodated in the cylindrical space between the interior and exterior sections 5 and 6 of the head 7 of unrefrigerated pipe 1. The insulation comprises three layers 10, 11, and 12 proceeding axially. Layers 10, 11, and 12 differ in heat conductivity, with the layer 10 next to refrigerated pipe 2 having the lowest and the layer 12 next to unrefrigerated pipe 1 having the highest coefficient of heat conductivity. The layer 11 between layers 10 and 12 will accordingly have an intermediate coefficient. The insulating action of layers 10, 11, and 12 accordingly becomes more effective toward refrigerated pipe 2 and less effective toward unrefrigerated pipe 1. The various coefficients can be obtained by varying the material, thickness, and density of the layers. Layers 10, 11, and 12 can vary in thickness in accordance with the desired level of insulation.

The differences in the coefficients of heat conductivity range between 10 W/mK at the end toward unrefrigerated pipe 1 and 0.2–0.6 W/mK at the toward refrigerated pipe 2. The insulation can be either mineral or fiber. It can be poured molten into the cylindrical space and allowed to harden or it can be introduced solid.

As coolant flows through the cylindrical space between the core 3 and the jacket 4, the wall of jacket 4 will assume a temperature approximating that of the coolant. The coolant will effectively refrigerate the outside of core 3, which is conveying the hot gas flowing in from unrefrigerated pipe 1. The result will be a wall temperature definitely below that of the gas, and specifically near that of the coolant. The temperature at the inner surfaces of unrefrigerated pipe 1 and of interior section 5 will be near that of the hot gas.

Due to the insulation in the cylindrical space in the head 7 of unrefrigerated pipe 1, the wall of exterior section 6 will assume a temperature below that of the wall of unrefrigerated pipe 1. The temperature of section 6 will depend on the temperature of the hot gas, the temperature of the coolant, and the effect of the insulation. Since, due to the different heat conductivities of layers 10, 11, and 12, the effect of the insulation is weakest next to unrefrigerated pipe 1, the temperature of the wall of exterior section 6 will increase gradually and less suddenly toward the joint between pipes 1 and 2 embodied by seam 8 than it would if the insulation were uniform, almost attaining at the seam the temperature of the wall of the jacket 4 of refrigerated pipe 2. Heat stress will accordingly be entirely or extensively eliminated not only in exterior section 6 but also in seam 8.

Accommodated in the vicinity of the gap between pipes 1 and 2 and between the face of the core 3 of refrigerated pipe 2 and that of the interior section 5 of unrefrigerated pipe 1 is a flexible component in the form of an O ring 13. O ring 13 rests tight against both faces and prevents hot gas from unrefrigerated pipe 1 from penetrating into the cylindrical space between sections 5 and 6. This feature counteracts the risk of solids precipitating out of the gas and onto layers 10, 11, and 12 to the detriment of insulation. This risk is particularly serious when the gas has just been cracked, in which event fine carbon can precipitate in the form of soot if the cooling cannot be controlled.

We claim:

1. A joint between a hot unrefrigerated pipe and a refrigerated pipe, comprising: an unrefrigerated pipe having a head with a bifurcated cross-section and with two sections joined at one end; one of said sections being an exterior section fastened tight to the refrigerated pipe; the other one of said sections being an interior section extending into the refrigerated pipe leaving a radial and an axial gap between said interior section and said refrigerated pipe for allowing thermal expansion between said unrefrigerated and refrigerated pipes; heat insulation in a cylindrical space between said interior section and said exterior section for maintaining low thermal stresses at the joint; and a flexible component between a frontal face of said refrigerated pipe and a frontal face of said interior section of said unrefrigerated pipe and resting tightly against said frontal faces for preventing gas from said unrefrigerated pipe to pass through said gap and penetrate into said heat insulation and for preventing solids to precipitate out of the gas and deposit on the said heat insulation and thereby affect insulating properties of said heat insulation and increase the thermal stresses at the joint, said flexible component lying tightly against said frontal surfaces to seal said gap and allow simultaneously thermal expansion of said pipes.

2. A joint as defined in claim 1, wherein said flexible component is an O-ring.

3. A joint as defined in claim 1, wherein said heat insulation comprises an axial series of layers, each layer having a different heat conductivity from the other layers.

4. A joint as defined in claim 3, wherein the layer next to said refrigerated pipe has the lowest coefficient of heat conductivity and the coefficient of heat conductivity of each layer increases with distance of the layer from the refrigerated pipe.

5. A joint between a hot unrefrigerated pipe and a refrigerated pipe, comprising: an unrefrigerated pipe having a head with a bifurcated cross-section and with two sections joined at one end; one of said sections being an exterior section fastened tight to the refrigerated pipe; the other one of said sections being an interior section extending into the refrigerated pipe leaving a radial and an axial gap between said interior section and said refrigerated pipe for allowing thermal expansion between said unrefrigerated and refrigerated pipes; heat insulation in a cylindrical space between said interior section and said exterior section for maintaining low thermal stresses at the joint; and a flexible component between a frontal face of said refrigerated pipe and a frontal face of said interior section of said unrefrigerated pipe and resting tightly against said frontal faces for preventing gas from said unrefrigerated pipe to pass through said gap and penetrate into said heat insulation and for preventing solids to precipitate out of the gas and deposit on the said heat insulation and thereby affect insulating properties of said heat insulation and increase the thermal stresses at the joint, said flexible component lying tightly against said frontal surfaces to seal said gap and allow simultaneously thermal expansion of said pipes; said flexible component being an O-ring; said heat insulation comprising an axial series of layers, each layer having a different heat conductivity from the other layers; the layer next to said refrigerated pipe having the lowest coefficient of heat conductivity and the coefficient of heat conductivity of each layer increasing with distance of the layer from the refrigerated pipe.

6. A joint between a hot unrefrigerated pipe and a refrigerated pipe, comprising: an unrefrigerated pipe having a head with a bifurcated cross-section and with two sections joined at one end; one of said sections being an exterior section fastened tight to the refrigerated pipe; the other one of said sections being an interior section extending into the refrigerated pipe leaving a radial and an axial gap between said interior section and said refrigerated pipe for allowing thermal expansion between said unrefrigerated and refrigerated pipes; heat insulation in a cylindrical space between said interior section and said exterior section for maintaining low thermal stresses at the joint; and a flexible component between a frontal face of said refrigerated pipe and a frontal face of said interior section of said unrefrigerated pipe and resting tightly against said frontal faces for preventing gas from said unrefrigerated pipe to pass through said gap and penetrate into said heat insulation and for preventing solids to precipitate out of the gas and deposit on the said heat insulation and thereby affect insulating properties of said heat insulation and increase the thermal stresses at the joint, said flexible component lying tightly against said frontal surfaces to seal said gap and allow simultaneously thermal expansion of said pipes; said flexible component being an O-ring; said heat insulation comprising an axial series of layers, each layer having a different heat conductivity from the other layers; the layer next to said refrigerated pipe having the lowest coefficient of heat conductivity and the coefficient of heat conductivity of each layer increasing with distance of the layer from the refrigerated pipe; said exterior section having a wall with a temperature decreasing gradually controllably until the temperature is substantially equal to the temperature of a wall of said refrigerated pipe adjacent to said joint; said unrefrigerated pipe having hot gas flowing therethrough and being a gas-cracking pipe, said refrigerated pipe and said unrefrigerated pipe being aligned and having substantially the same inside diameter; said refrigerated pipe being a double pipe with a core and a jacket, a coolant flowing through a cylindrical space between said core and said jacket; said exterior section being fastened tight to said jacket by an annular welded seam, said exterior section having an elevated edge around said jacket, said edge being as thick as the wall of said exterior section; said heat insulation being fiber.

* * * * *